H. G. & A. VOIGHT.
DRIVING BELT.
APPLICATION FILED JULY 26, 1911.

1,018,792.  Patented Feb. 27, 1912.

Witnesses:  Inventors
  H. G. Voight
  A. Voight
  By their Attorneys

UNITED STATES PATENT OFFICE.

HENRY G. VOIGHT AND AUGUST VOIGHT, OF NEW BRITAIN, CONNECTICUT.

DRIVING-BELT.

1,018,792. Specification of Letters Patent. Patented Feb. 27, 1912.

Original application filed April 22, 1909, Serial No. 491,574. Divided and this application filed July 26, 1911. Serial No. 640,612.

*To all whom it may concern:*

Be it known that we, HENRY G. VOIGHT and AUGUST VOIGHT, citizens of the United States, residing at New Britain, county of Hartford, State of Connecticut, have invented certain new and useful Improvements in Driving-Belts, of which the following is a full, clear, and exact description.

This invention relates to improvements in driving belts, and is a division from our copending application Serial No. 491,574, filed April 22, 1909.

The object of the invention, broadly speaking, is to provide a durable, effective and safe driving belt at a minimum of expense.

Figure 1:
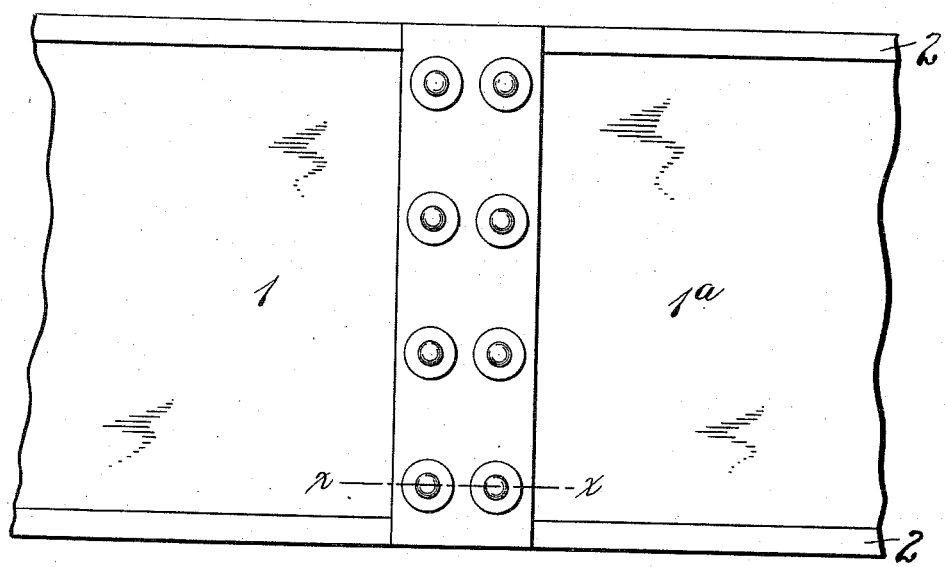
Figure 2:
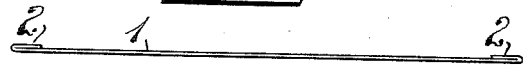
Figure 3:
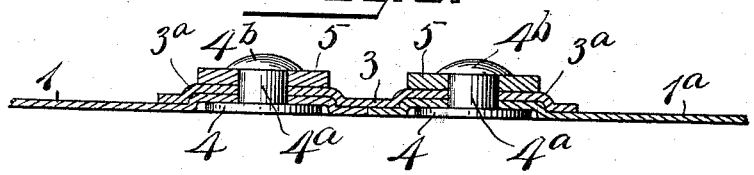

In the drawings Figure 1 is a plan view of two ends of a belt showing a line of connection. Fig. 2 is an end elevation of one end of the belt. Fig. 3 is a section on the line $x$—$x$ Fig. 1, said view being relatively enlarged.

The body of the belt proper is made of thin flexible steel, a stock of .012 to .015 of an inch being satisfactory for some purposes. The two ends of the main body of the belt are indicated at 1—1ª. Each edge of the belt is rolled up or folded back upon itself, as shown, to afford border reinforcements 2—2, which reinforcements perform several functions; for example, by folding the belt at its opposite edges to form the reinforcements 2—2 danger of tearing the stock at the edges is greatly reduced. Then again, by folding the edges of the belt upon themselves to form said border reinforcements, a smooth non-cutting edge is provided, greatly reducing the danger of personal injury should a workman come in contact with the belt. It will further be found that by providing the border reinforcements aforesaid the belt will track or guide much more accurately on a pulley than were the border reinforcements omitted.

3 represents a bridging strip constituting part of the connection for the two belt ends. As shown in the drawings, this bridging strip is countersunk, as at 3ª—3ª, the material of the belt ends 1—1ª adjacent thereto being forced into the countersunk portions by the heads 4—4 of rivets 4ª.

5—5 represent washers which surround the rivets 4ª—4ª, and on top of which the outer ends 4ᵇ—4ᵇ of said rivets bear when said rivets are upset or swaged. In this particular case the invention relates to the belt construction rather than to the method of connecting the ends. By preference the folded reinforcements 2—2 are pressed tightly down against the upper surface of the main body of the belt, and in running, such folds are preferably located on the outer side so as not to come in contact with the pulleys (not shown).

What we claim is:

1. A driving belt having its main body comprising a flexible metal strip with each opposite edge thereof reinforced or thickened, each reinforcement comprising a portion of the belt folded back upon itself.

2. A driving belt having its main body comprising a flexible metal strip and having a thickened border reinforcement along each edge thereof.

HENRY G. VOIGHT.
AUGUST VOIGHT.

Witnesses:
GWENDOLINE A. JACKSON,
EDWARD B. ALLING.

Copies of this patent may be obtained for five cents each, by addressing the "Commissioner of Patents, Washington, D. C."